Patented May 10, 1932

1,857,921

UNITED STATES PATENT OFFICE

WILBUR A. LAZIER, OF WILMINGTON, DELAWARE, ASSIGNOR TO E. I. DU PONT DE NEMOURS COMPANY, OF WILMINGTON, DELAWARE, A CORPORATION OF DELAWARE

CATALYTIC PRODUCTION OF ESTERS

No Drawing.    Application filed June 14, 1928. Serial No. 285,501.

This invention relates to processes for the catalytic production of esters by the catalytic dehydrogenation of alcohols, and more particularly relates to the conversion of primary aliphatic alcohols, e. g. ethyl alcohol in part to the corresponding esters, e. g. ethyl acetate. A major object of the invention is to improve upon such processes, and, in particular to provide processes of the general type wherein improved catalysts are utilized. To this end, and also to improve generally upon processes of the general character indicated, the invention consists in the various matters hereinafter described and claimed.

It is well-known that when the vapor of an alcohol is passed over a dehydrogenating catalyst at atmospheric pressure and at an elevated temperature, hydrogen is split off with the production of the corresponding aldehyde. It is not, however, widely known that the corresponding esters are always formed to some extent simultaneously with the aldehyde. It is, however, known that methanol, when thus dehydrogenated over a copper catalyst, yields, in addition to hydrogen and formaldehyde, appreciable amounts of methyl formate. I have discovered that with a proper selection of the catalyst and operating conditions, the formation of esters during the dehydrogenation of primary aliphatic alcohols is a very general phenomenon.

In general accordance with the invention I employ in processes of the general type in question, instead of copper catalysts previously suggested, difficultly reducible dehydrogenating oxides such as zinc oxide, manganese oxide, or magnesium oxide, or mixtures of these with each other or with other oxides. Such other oxides may desirably be oxides less active but more acidic than zinc oxide, and so forth, such as the oxides of vanadium, chromium, tungsten, molybdenum or uranium, which may serve as promoters for the dehydrogenating oxides. Also, practice in accordance with the invention may comprise employing ordinarily reducible metallic oxides, such as the oxides of copper, cadmium, lead or tin, when combined with difficultly reducible oxides, in such a manner and amount that the metals are maintained substantially in the oxide form, even though in the presence of reducing gases. Thus the invention comprises the employment, instead of catalysts consisting substantially of metallic copper, difficultly reducible dehydrogenating oxides alone or when incorporated or combined with less active but more acidic oxides, or with ordinarily reducible metallic oxides in such a way that the metals are maintained substantially in oxide form, or with both types of oxide.

By dehydrogenating oxides is meant those oxides which preferentially dehydrogenate alcohols at ordinary pressure and elevated temperature with the formation of aldehydes, rather than dehydrate the alcohols with the formation of olefins; and these oxides, in the order of their importance, are the oxides of zinc, manganese, magnesium and cerium. By difficultly reducible, or substantially non-reducible, oxides is meant those metallic oxides which are not essentially reduced to metal by prolonged exposure in a state of purity to the action of hydrogen at atmospheric pressure at 400° C. to 450° C.

The advantages of oxide catalysts, as above mentioned, are several and substantial. They give rise to a higher ester-aldehyde ratio in the products of reaction than do catalysts composed of reduced metals; they are relatively immune to degenerative processes, such as sintering, poisoning, and so on, being thus distinguished from metal catalysts which deteriorate rapidly when subjected to excess heat, etc.; and they, unlike the metal catalysts which produce as by-products saturated hydrocarbons having no chemical utility, produce olefinic hydrocarbons which may be readily recovered in the form of useful derivatives.

Without restriction of the invention thereto, the following examples illustrate practice in accordance therewith:—

*Example 1.*—About 5 liters of normal butyl alcohol is vaporized at atmospheric pressure and passed during the course of one hour over one liter of pure manganese oxide heated to 400° C. Hydrogen is split off, and for every 100 molecules of the alcohol so treated about 15 react to form normal butyl butyrate and about an equal number to form normal butyraldehyde. The products are separated by fractional distillation after which the unchanged alcohol may be passed over the catalyst a second time.

*Example 2.*—Methyl alcohol vapor is passed over a contact mass consisting of two parts by weight of magnesium oxide, one part by weight of cadmium oxide and 2 parts by weight of chromium oxide heated to a temperature of 350° C. The metallic oxides of which the catalyst is composed are not appreciably reduced to the metallic state. The liquid products of the reaction contain besides formaldehyde, substantial quantities of methyl formate, usually equal in weight to, or greater than the amount of formaldehyde produced.

*Example 3.*—Ethanol is vaporized in a closed system in such a way that the pressure is maintained at about 3000 lbs. per sq. inch. The compressed vapor is passed over a contact mass heated to 375° C. and prepared by reducing basic zinc chromate with hydrogen. By means of catalytic dehydrogenation of the alcohol, about 3% by weight is converted to acetaldehyde and about 10% by weight to ethyl acetate. A small percentage is converted to compounds of a higher order. Contrary to the case when a copper catalyst is employed, the catalytic activity remains good over a very considerable period of time. The effluent gas contains about 5% of unsaturated hydrocarbons whereas with a copper catalyst it contains about an equal percentage of saturated hydrocarbons.

The yield of ester has been found to be dependent not only on the nature of the catalyst but on the kind of alcohol and the operating pressure and temperature as well. Among the primary alcohols of the aliphatic series, it has been found that, with the exception of methanol, the yield of ester formation increases with increase in molecular weight. For example, with butyl alcohol good yields of butyl butyrate are obtainable when working at atmospheric pressure; while with ethanol it is advisable, in order to obtain good yields, to work under pressure.

The following will illustrate the importance of the nature of the catalyst on the ester-aldehyde yield, and the superiority of an oxide catalyst over copper for ester production. Normal butanol vapor was passed at the rate of about five volumes of liquid butanol per volume of catalyst per hour over a copper catalyst at atmospheric pressure, and also like vapor was passed under like conditions over a zinc oxide catalyst, and the condensate subjected to analysis. The results are shown in the following table, the temperatures used during the experiments, degrees centigrade, being also shown:—

| Copper | | | Zinc oxide | | |
|---|---|---|---|---|---|
| Temperature | % to aldehyde | % to ester | Temperature | % to aldehyde | % to ester |
| 275 | 62 | 9 | 300 | 5 | 5 |
| 300 | 58 | 6 | 350 | 12 | 16 |
| 350 | 66 | 5 | 400 | 24 | 27 |
|  |  |  | 450 | 21 | 19 |

The copper catalyst was prepared by reducing granules of pure fused copper oxide. The zinc oxide was prepared by gentle ignition of zinc oxalate. The yields, as given in the table, are given in mole percent of the alcohol passed over the catalyst converted to aldehyde and to ester.

In particular reference to the dehydrogenation of ethanol in the vapor phase, I would note that the desirable pressure range is between 1000 and 4000 lbs. per sq. in., and the temperature range from 375° C. to 425° C. the preferred pressure and temperature being 3000 lbs. per sq. in., and 400° C., respectively. The preferred space velocity is 16 volumes of liquid ethanol per volume of catalyst per hour. Ethyl acetate is the principal product with small yields of acetaldehyde, normal butanol, crotonyl alcohol, hexyl alcohol, esters of these alcohols, and higher boiling products. As, for example, illustrated by the above "Example 1", the catalysts are also suitable for the manufacture of other esters than ethyl acetate, for example, butyl butrate from butanol, and pressure is not necessarily required. As a general rule, catalysts suitable for methanol and higher alcohol synthesis are also suitable for the ethyl acetate reaction. Among the single component difficultly reducible oxide catalysts, the dehydrogenating oxides are more suitable.

Returning now to the oxides to be used in accordance with the invention, better results are generally obtainable if a mixture of oxides is employed, at least one of which is a dehydrogenating oxide. Usually the oxide employed in admixture with the dehydrogenating oxide has little activity by itself, or is much less active than the dehydrogenating oxide employed with it, but it yet serves to further promote activity of the more active oxide. It will be observed that the dehydrogenating oxides named above, the oxides of zinc, manganese, magnesium and cerium, are rather basic in nature. As previously mentioned, the usual promoter oxides are acidic in nature; and they readily form compounds with the dehydrogenating oxides. The oxides of the higher groups of the periodic table, for example, the oxides of chromium, vanadium, tungsten, titanium and molybdenum, are suitable promoters for zinc oxide. Of these, chromium oxide is preferred, since it exhibits the least tendency toward catalyzing destructive side reactions.

I have found that the use of chromium oxide permits the use of a large number of oxides ordinarily regarded as easily reducible. Such reducible oxides when combined with chromium oxide are only partially reduced under the conditions of operation and are found to be very effective catalysts for the production of esters. The oxides of cadmium, copper, tin, lead and bismuth are all examples of oxides that may thus be employed in a more difficultly reducible form. The catalysts consisting of both reduced metal and non-reduced oxide are active even though the reaction may be carried out at a temperature above the fusion point of the metals. Such mixed catalysts are conveniently employed in the form of chromates or chromites of the metals.

Basic zinc chromate when partially reduced with hydrogen is outstanding as a catalyst for dehydrogenation by virtue of its high activity and absence of side reactions. It may be prepared by treating zinc oxide with chromic acid, by precipitation of a zinc salt with an alkali chromate, or by other suitable means. Manganese chromate is also suitable.

As to chromite catalysts, the greatest success has been attained by employing chromite catalysts prepared as set forth in my copending United States application Serial No. 115,692, filed June 12, 1926, for catalysts and catalytic processes. Zinc chromite prepared by the ignition of basic zinc ammonium chromate (ZnOH(NH$_4$)CrO$_4$) possesses a good activity, long life and relative freedom from side reactions. Copper chromite is also active but becomes poisoned more readily than zinc chromite. Manganese chromite may also be employed instead of zinc chromite.

Regarding zinc chromite, I have found that the already great activity thereof may be still further enhanced by the addition of 5 to 20 mole percent of the chromite or chromate of a reducible oxide. For example, the catalyst may consist of zinc chromite with the chromates or chromites of cadmium, copper, tin, lead, or bismuth. Of these combinations, the first and second give the best results. It may, in some instances, be advisable to employ two or more reducible oxides in small amounts together with zinc chromite. Mixed chromite catalysts are best prepared by precipitating the mixed double ammonium chromates of the metals from solutions of the salts with ammonium chromate. Ignition of the mixed double ammonium chromates then yields the desired mixed chromites.

As illustrating points above mentioned, the following are given by way of example:—

*Example 4.*—Basic zinc ammonium chromate is prepared by mixing in equimolecular proportions solutions of zinc sulfate and ammonium chromate. Precipitation is completed by the addition of ammonium hydroxide to neutrality. The precipitate is decanted, washed thoroughly by decantation, filtered and dried. When heated to about 400° C. the yellow basic zinc ammonium chromate decomposes exothermically with the formation of a mixture of zinc chromite and zinc oxide. When properly prepared, the sulfate content is less than 2%. The product is compressed into briquettes of suitable form. The catalyst is contained in a heated vessel capable of withstanding high pressure and the vapor of 95% ethanol is passed over it at a temperature of 400° C. and pressure of 3000 lbs. per sq. in. The rate of flow is about 16 volumes of liquid ethanol per volume of catalyst per hour. Twelve percent by weight of the ethanol is converted to ethyl acetate and hydrogen, small amounts of acetaldehyde, ethylene, crotonyl alcohol, higher alcohols and esters being formed by side reactions. The products of reaction are removed thru a pressure-releasing valve and are separated by cooling and fractional distillation.

*Example 5.*—An oxide mixture is prepared by treating stannous chloride with a solution of ammonium hydroxide and ammonium chromate. The precipitate is filtered, slightly washed and dried and heated to 400° C. A catalyst thus prepared and containing 78% of tin, 9.5% of chromium and 11.5% of chlorine, when used according to Example 4 converts about 10% of the ethanol to ethyl acetate.

*Example 6.*—Zinc copper chromite is prepared by co-precipitating the basic double ammonium chromates of copper and zinc and igniting the mixed salt. A catalyst containing 10 mole percent of copper chromite and 90 mole percent of zinc chromite when employed under the conditions of Example 4 yields a condensate containing about 18% by weight of ethyl acetate together with other products.

*Example 7.*—To a solution of 270 g. of zinc nitrate and 40 g. of cadmium nitrate is added a solution of 150 g. of ammonium chromate and 50 cc. of strong ammonium hydroxide. The precipitate is washed, filtered, dried and heated to 400° C. When employed according to Example 4, this catalyst converts about 15% of the alcohol vapor passing over it to ethyl acetate.

With respect to the use of a mixed chromite catalyst in the high pressure dehydrogenation of ethanol, particularly good yields are obtainable by the use of a mixed chromite catalyst of a certain definite composition. Such a catalyst may be made as follows:—
A mixed solution of 75 moles of zinc sulfate, 10 moles of copper sulfate and 15 moles of cadmium sulfate is precipitated with a solution of 100 moles of ammonium chromate. Ammonium hydroxide is added to neutrality and the mixed double ammonium chromates are filtered, washed and dried. By heating the dry salts at 400° C., an exothermic decomposition takes place, leaving a black residue in which the chromium oxide is chiefly in the trivalent condition. It appears that much of the cadmium chromate remains in the catalyst as such, while practically all of the copper and zinc is converted to the corresponding chromite-oxide mixture. The catalytic material is suitably granulated by briquetting.

The solutions used for precipitation are preferably of two molar concentration. Nitrates or chlorides of the metals may be used with equal success. This method of preparation is not claimed herein, it being the subject of my United States application Serial No. 200,507, filed June 21, 1927, for catalytic processes, Lazier Case 2—A. In addition to improving the yield of ethyl acetate, the preferred catalyst enhances the yield of butanol, crotonyl alcohol, and other higher alcohols and their esters.

In explanation of the temperature of 400° C. mentioned above, I might say that while a red heat (above 600° C.) is necessary for the conversion of the chromate of a heavy metal to chromite, it is not necessary to heat double ammonium chromates of the same metals above 400° C. to effect the conversion. In practice, it is desirable to use 400°. It is yet true, however, that the heat of the reaction is sufficient to raise the mass to a red heat if it is closely confined in a vessel.

When used in the two-pass system disclosed by C. H. Greenewalt in his United States application Serial No. 284,001 filed June 8, 1928, the above described catalyst yields a condensate from the first reaction tube containing 18 g. of ethyl acetate per 100 cc. and from the second, a content of 23 g. As illustrating the improvement arising from the use of a catalyst of the stated composition, the yields under the same conditions with a single zinc chromite catalyst are represented by 12 g. and 15 g. per 100 cc., respectively.

In view of all the above, it will be understood that, unless otherwise indicated, references in the claims to oxides are to be taken as including chromites and chromates.

I claim:

1. In the carrying on of a catalytic dehydrogenation process for converting alcohols to esters: passing the alcohol into catalytic relation to a catalyst consisting substantially of a difficultly reducible dehydrogenating oxide of a metal at a temperature at which esters will form in substantial amounts, said temperature being in excess of 350° C.

2. In the carrying on of a catalytic dehydrogenation process for converting alcohols to esters: passing the alcohol into catalytic relation to a catalyst consisting substantially of a difficultly reducible oxide of a metal of the second group of the periodic table at a temperature at which esters will form in substantial amounts, said temperature being in excess of 350° C.

3. In the carrying on of a catalytic dehydrogenation process for converting alcohols to esters: passing the alcohol into catalytic relation to a catalyst consisting substantially of a difficultly reducible dehydrogenating oxide and, as a promoter, a more acidic oxide.

4. In the carrying on of a catalytic dehydrogenation process for converting alcohols to esters: passing the alcohol into catalytic relation to a catalyst consisting substantially of a difficultly reducible oxide of the second group of the periodic table and, as a promoter, a more acidic oxide.

5. In the carrying on of a catalytic dehydrogenation process for converting alcohols to esters: passing the alcohol into catalytic relation to a catalyst comprising an ordinarily reducible oxide of a metal and a difficultly reducible oxide of a metal, in such a ratio to each other that the metals are maintained substantially in oxide form despite the presence of reducing gases.

6. In the carrying on of a catalytic dehydrogenation process for converting ethyl alcohol to ethyl acetate: passing the alcohol under substantially superatmospheric pressure into catalytic relation to a catalyst consisting substantially of a difficultly reducible dehydrogenating oxide of a metal.

7. In the carrying on of a catalytic dehydrogenation process for converting ethyl alcohol to ethyl acetate: passing the alcohol under substantially superatmospheric pressure into catalytic relation to a catalyst comprising an ordinarily reducible oxide of a metal and a difficultly reducible oxide of a metal, in such a ratio to each other that the metals are maintained substantially in oxide form despite the presence of reducing gases.

8. In the carrying on of a catalytic dehydrogenation process for converting ethyl alcohol to ethyl acetate: passing the alcohol, under a pressure substantially between 1000 and 4000 pounds per square inch, at a temperature substantially between 375° C. and 425° C. and at a velocity of substanitally 16 volumes of liquid alcohol per volume of catalyst per hour, into catalytic relation to a catalyst consisting substantially of a difficultly reducible dehydrogenating oxide.

9. In the carrying on of a catalytic dehydrogenation process for converting ethyl alcohol to ethyl acetate: passing the alcohol, under a pressure substantially between 1000 and 4000 pounds per square inch, at a temperature substantially between 375° C. and 425° C. and at a velocity of substantially 16 volumes of liquid alcohol per volume of catalyst per hour, into catalytic relation to a catalyst comprising an ordinarily reducible metallic oxide and a difficultly reducible oxide, in such a ratio to each other that the metals are maintained substantially in oxide form despite the presence of reducing gases.

10. In the carrying on of a catalytic dehydrogenation process for converting alcohols to esters: passing the alcohol into catalytic relation to a catalyst consisting substantially of zinc oxide and chromium oxide.

11. In the carrying on of a catalytic dehydrogenation process for converting alcohols to esters: passing the alcohol into catalytic relation to a catalyst consisting substantially of chromium oxide and an easily reducible oxide.

12. In the carrying on of a catalytic dehydrogenation process for converting alcohols to esters: passing the alcohol into catalytic relation to a catalyst consisting substantially of zinc chromite.

13. In the carrying on of a catalytic dehydrogenation process for converting alcohols to esters: passing the alcohol into catalytic relation to a catalyst consisting substantially of zinc chromite and a chromium compound of a readily reducible oxide.

14. In the carrying on of a catalytic dehydrogenation process for converting alcohols to esters: passing the alcohol into catalytic relation to a catalyst comprising a difficultly reducible dehydrogenating oxide, and, as a promoting agent, a more acidic oxide and an ordinarily reducible metallic oxide.

15. In the process of producing reaction products from alcohols: passing an alcohol over a dehydrogenating non-metallic catalyst, which catalyst is a compound of a metal, at a temperature of at least 350° C., said catalyst being an ester-forming catalyst at the said temperature.

16. In the process of producing reaction products from alcohols: passing an alcohol over a dehydrogenating non-metallic catalyst, which catalyst is a compound of a metal, at a temperature of between 350° and 450° C., said catalyst being an ester-forming catalyst at the said temperature.

17. In the process of obtaining esters from alcohols, the step which comprises passing an alcohol in contact with a dehydrogenating non-metallic catalyst, which catalyst is a compound of a metal, at a temperature sufficiently elevated to form esters in substantial amounts, said temperature being in excess of 350° C.

18. In the process of obtaining esters from alcohols, the step which comprises passing an alcohol, at a temperature in excess of 350° C. into contact with a catalyst which is an ester-forming catalyst at said temperature, and which comprises a difficultly reducible dehydrogenating oxide of a metal.

19. The process described in claim 3 in which the promoter is chromium oxide.

20. In the carrying on of a catalytic dehydrogenation process for converting alcohols to esters: passing the alcohol into catalytic relation to a catalyst consisting substantially of a heavy metal chromite.

21. In the carrying on of a catalytic dehydrogenation process for converting alcohols to esters: passing the alcohol into catalytic relation to a catalyst consisting substantially of a chromite prepared by ignition of a heavy metal chromate.

22. In the carrying on of a catalytic dehydrogenation process for converting alcohols to esters: passing the alcohol into catalytic relation to a catalyst consisting substantially of a chromite prepared by ignition of an ammonium chromate of a heavy metal.

In testimony whereof, I affix my signature.

WILBUR A. LAZIER.